US011018585B2

(12) United States Patent
Diotte et al.

(10) Patent No.: US 11,018,585 B2
(45) Date of Patent: *May 25, 2021

(54) SWITCHING REGULATOR STABILITY CONTROL CIRCUIT AND METHODOLOGY

(71) Applicant: Chaoyang Semiconductor Jiangyin Technology Co., Ltd., Jiangyin (CN)

(72) Inventors: Bertrand Diotte, San Diego, CA (US); Mykhaylo Teplechuk, San Diego, CA (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,833

(22) Filed: Nov. 4, 2019

(65) Prior Publication Data

US 2020/0076309 A1    Mar. 5, 2020

Related U.S. Application Data

(63) Continuation of application No. 16/269,502, filed on Feb. 6, 2019, now Pat. No. 10,498,242.

(60) Provisional application No. 62/627,364, filed on Feb. 7, 2018.

(51) Int. Cl.
*H02M 3/158* (2006.01)
*H02M 1/15* (2006.01)
*H02M 1/34* (2007.01)

(52) U.S. Cl.
CPC ............. *H02M 3/158* (2013.01); *H02M 1/15* (2013.01); *H02M 2001/344* (2013.01)

(58) Field of Classification Search
CPC ... H02M 3/158; H02M 1/15; H02M 2001/344
See application file for complete search history.

(56) References Cited

U.S. PATENT DOCUMENTS

| 7,230,838 | B2 | 6/2007 | Xu |
| 10,498,242 | B2* | 12/2019 | Diotte ................... H02M 3/158 |
| 2001/0055186 | A1 | 12/2001 | Wodrich et al. |
| 2013/0027006 | A1* | 1/2013 | Holloway ............. H02M 3/158 323/235 |

(Continued)

FOREIGN PATENT DOCUMENTS

| CN | 105356436 A | 2/2016 |
| JP | H06-006983 A | 1/1994 |

(Continued)

OTHER PUBLICATIONS

International Search Report on related PCT Application No. PCT/US2019/016925 from International Searching Authority (KIPO) dated May 24, 2019.

(Continued)

*Primary Examiner* — Jue Zhang
(74) *Attorney, Agent, or Firm* — Klein, O'Neill & Singh, LLP (57) ABSTRACT

A power stage output node stabilizer may be used to reduce ringing of a power stage output node of a switching DC-DC power converter. The power stage output node stabilizer may be a network of resistors and switches coupling the power stage output node to a higher voltage level and a lower voltage level.

7 Claims, 5 Drawing Sheets

FIG. 1

(56) References Cited

U.S. PATENT DOCUMENTS

2016/0065065 A1* 3/2016 Noebauer .......... H02M 3/1588
                                                323/271
2016/0118894 A1   4/2016 Zhang et al.
2019/0245445 A1*  8/2019 Diotte ................. H02M 3/1584

FOREIGN PATENT DOCUMENTS

JP   2006-311728 A   11/2006
JP   2010-088177 A    4/2010

OTHER PUBLICATIONS

Written Opinion on related PCT Application No. PCT/US2019/016925 from International Searching Authority (KIPO) dated May 24, 2019.

U.S. Appl. No. 16/269,502, filed Feb. 6, 2019, Bertrand Diotte Mykhaylo Teplechuk, US 2019-0245445 A1, Notice of Allowance dated Aug. 1, 2019.

* cited by examiner

SWITCHING REGULATOR STABILITY CONTROL CIRCUIT AND METHODOLOGY

CROSS-REFERENCE TO RELATED APPLICATIONS

This application is a continuation of U.S. patent application Ser. No. 16/269,502, filed Feb. 6, 2019, which claims the benefit of the filing date of U.S. Provisional Patent Application No. 62/627,364, filed on Feb. 7, 2018, the disclosures of which are incorporated by reference herein.

BACKGROUND OF THE INVENTION

The present invention relates generally to switching power converters, and more particularly to reducing ringing at a power stage output node of a DC-DC switching power converter.

Integrated circuits generally require provision of power within particular parameters during operation. The provision of such power may face many complexities. For example, semiconductor chips including the integrated circuits may have different portions that require power at the same or different times, and which may utilize different amounts of power at different times.

DC-DC switching power converter may be often used to regulate the power provided to the integrated circuits. Some DC-DC switching power supplies utilize a power stage that includes a pair of switches serially arranged between a higher voltage source and a lower voltage source, for example between terminals of a battery serving as a power source. An output node of the power stage, for example a node between the pair of switches, may be coupled to one end of an inductor, with the other end of the inductor coupled to a load formed of the integrated circuit, in parallel to an output capacitor of the power converter.

Of the pair of switches, the switch coupled to the higher voltage source may be termed a high side switch, and the switch coupled to the lower voltage source may be termed a low side switch. In operation, the high side switch may be closed at some times (with the low side switch open), the low side switch may be closed at other times (with the high side switch open), and both switches may be open at still other times, all depending on various considerations relating to power consumption by the load and state of the power converter.

At times ringing may occur at the output node of the power stage. For example, with the high side switch and the low side switch both open, and the output node of the power stage therefore floating with respect to voltage, in discontinuous conduction mode (DCM) ringing and concomitant high frequency noise may present at the output node. This noise may have deleterious effects on provision of power to the load.

BRIEF SUMMARY OF THE INVENTION

Aspects of some embodiments in accordance with the invention provide for reduced ringing of an output node of a power stage of a switching power converter. In some embodiments the power stage output node is coupled via resistances to higher and lower voltage levels at least some of the time when the power stage output node would otherwise be in a high impedance state.

Aspects of some embodiments in accordance with the invention provide a DC-DC switching power converter with a power stage output node stabilizer, comprising: a high side switch and a low side switch coupled in series between a higher voltage and a lower voltage; an inductor, with a first end and a second end, the first end coupled to a power output stage node between the high side switch and the low side switch; a capacitor coupled to the second end of the inductor, in parallel to a load; a plurality of resistive legs coupling the power stage output node and the higher voltage and the lower voltage, each of the resistive legs including a high side portion coupling the power stage output node and the higher voltage and a low side portion coupling the power stage node and the lower voltage, each high side portion of each resistive leg including a first switch for activating that high side portion, and each low side portion of each resistive leg including a second switch for activating that low side portion, each of the high side portions and each of the low side portions having an associated resistance.

Aspects of some embodiments in accordance with the invention provide a method for reducing ringing of an output node of a power stage of a switching power converter, the switching power converter including a high side switch and a low side switch coupled in series between a higher voltage and a lower voltage and an output filter coupled to a power stage output node, the power stage output node being between the high side switch and the low side switch comprising: determining that both the high side switch and the low side switch have been opened; closing a first plurality of switches coupling the power stage output node to the higher voltage by way of a first set of resistances and closing a second plurality of switches coupling the power stage output node to the lower voltage by way of a second set of resistances, in response to determining that both the high side switch and the low side switch have been opened; and progressively opening the first plurality of switches and the second plurality of switches over a predetermined period of time after closing the first plurality of switches and closing the second plurality of switches.

Aspects of some embodiments in accordance with the invention provide a DC-DC switching power converter with a power stage output node stabilizer, comprising: a high side switch and a low side switch coupled in series between a higher voltage and a lower voltage; an output filter coupled to a power stage output node, the power stage output node being between the high side switch and the low side switch; and a first plurality of selectively enabled resistances between the higher voltage and the first node; and a second plurality of selectively enabled resistances between the lower voltage and the first node.

These and other aspects of the invention are more fully comprehended upon review of this disclosure.

DETAILED DESCRIPTION

Figure 1:
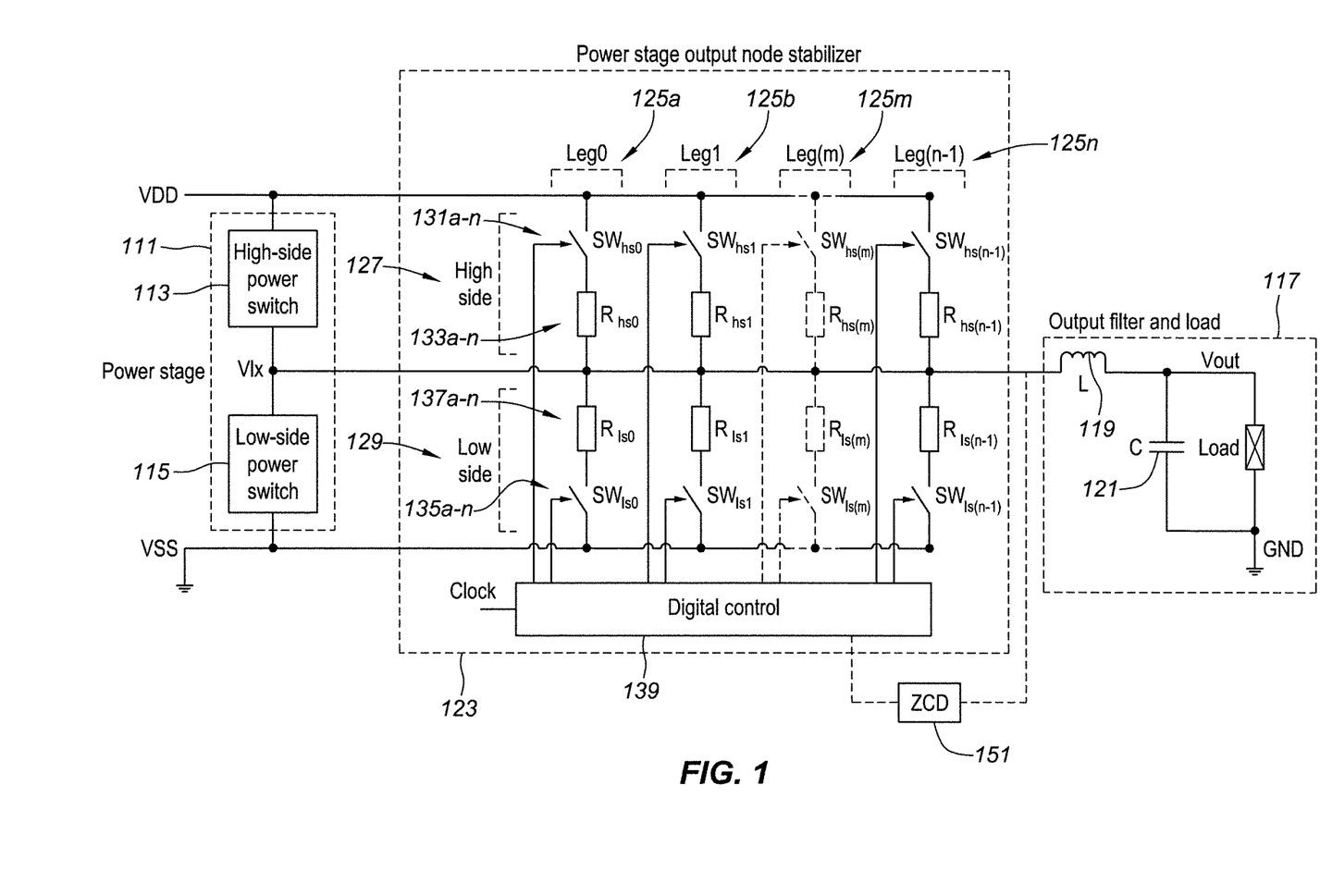
FIG. 1 is a semi-block diagram semi-schematic showing a power stage output node stabilizer in the context of a power regulator in accordance with aspects of the invention.

FIG. 1 is a semi-block diagram semi-schematic showing a power stage output node stabilizer in the context of an example power regulator in accordance with aspects of the invention. The power regulator illustrated in FIG. 1 is a buck DC-DC switching power converter. A power stage 111 includes a high side switch 113 and a low side switch 115 coupled in series between a higher voltage VDD and a lower voltage VSS, which in this case is ground. A power stage output node (terminal Vlx, for convenience), between the high side switch and the low side switch, is coupled to an output filter and, through the filter, a load block 117. As illustrated in FIG. 1, the output filter includes an output inductor 119 in series with the load, with the output inductor having a first end coupled to the power stage output node Vlx and a second end coupled to the load, and an output capacitor 121 in parallel to the load. In operation, either the high side switch is closed and the low side switch is open, the low side switch is closed and the high side switch is open, or both switches are open.

A power stage output node stabilizer 123 couples the node Vlx to a higher voltage source and a lower voltage source. The power stage output node stabilizer, or stabilizer for short, may be used to force the potential of the node Vlx to or towards a desired voltage. In some embodiments, and as illustrated in FIG. 1, the higher voltage source is VDD and the lower voltage is VSS. The stabilizer may therefore be considered to be in parallel to the power stage, and the stabilizer may be used to force the potential of the node Vlx to or towards a voltage between VDD and VSS. Also as illustrated in FIG. 1, the stabilizer may be considered to be coupled between the power stage output node Vlx and the output inductor.

In some embodiments the stabilizer includes selectively enabled resistances between the power stage output node Vlx and the higher voltage source, and between the power stage output node Vlx and the lower voltage source. In various embodiments at least some of both the resistances between the power stage output node Vlx and the higher voltage source and the resistances between the power stage output node Vlx and the lower voltage source are simultaneously enabled at the same time. In some embodiments the resistances are provided by transistors operating in their linear range, in some embodiments the resistances are provided by resistors, and in some embodiments the resistances are provided both by transistors operating in their linear range and by resistors. In embodiments in which the resistances are provided by resistors, the resistances may be enabled for example using one or more switches.

In some embodiments the stabilizer includes a plurality of legs 125a-n coupling the power stage output node Vlx and higher and lower voltage sources. For example, the stabilizer of FIG. 1 includes a plurality of legs, Leg0-Leg(n−1). Each of the legs includes a high side portion 127 and a low side portion 129, with the high side portion coupling Vlx to VDD and the low side portion coupling Vlx to VSS. The high side portion includes, for each of the legs, first switches 131 activating the high side portion and first resistors 133. The first switches may be independently activated (closed) and deactivated (opened). The low side portion similarly includes second switches 135 activating the low side portion and second resistors 137. With switches closed, the resistance of each portion is the resistance of the resistor and the switch in the ON or closed position. In some embodiments the resistors may be replaced by one or more transistors operating in their linear range, or a combination of resistors and transistors.

Each resistor and switch may have different resistances, and a ratio between each high side portion and low side portion of a leg may be between 0 and 1, inclusive (with respect to 1). In some embodiments the ratio is equal to a ratio between a desired output voltage, $V_{out}$, of the power converter and VDD minus VSS, or $V_{out}/(VDD-VSS)$. In such embodiments, the stabilizer effectively forces Vlx towards a potential equal to $V_{out}$. In other embodiments the ratio is equal to some other value. In some embodiments different legs have different resistances; for example a high side portion of one leg may have a greater resistance than a high side portion of another leg, or in some embodiments, any other leg.

A digital control 139 activates the switches. In some embodiments the digital control comprises circuitry. In some embodiments the digital control comprises logic circuitry. In some embodiments the digital control comprises programmable logic circuitry. In some embodiments the digital control activates (closes) the switches in response to both the high side switch and the low side switch being open. In some embodiments the digital control activates the switches only when both the high side switch and the low side switch are open. In some embodiments the digital control activates the switches when both the high side switch and the low side switch are open, and inductor current is equal to zero. In some embodiments the digital control activates the switches only when both the high side switch and the low side switch are open, and inductor current is equal to zero. In some such embodiments, optional zero-crossing detector circuitry 151 may indicate such an event to the digital control. In some embodiments the digital control activates the switches when the high side switch and the low side switch are open and the converter enters discontinuous conduction mode (DCM). In some embodiments the digital control, after activation of the switches, deactivates various of the switches, for example on a leg-by-leg basis, over time. In some embodiments deactivation of the various switches over time serves to increase impedance provided by the legs over time, scaling down current drawn through the legs.

Figure 2A:
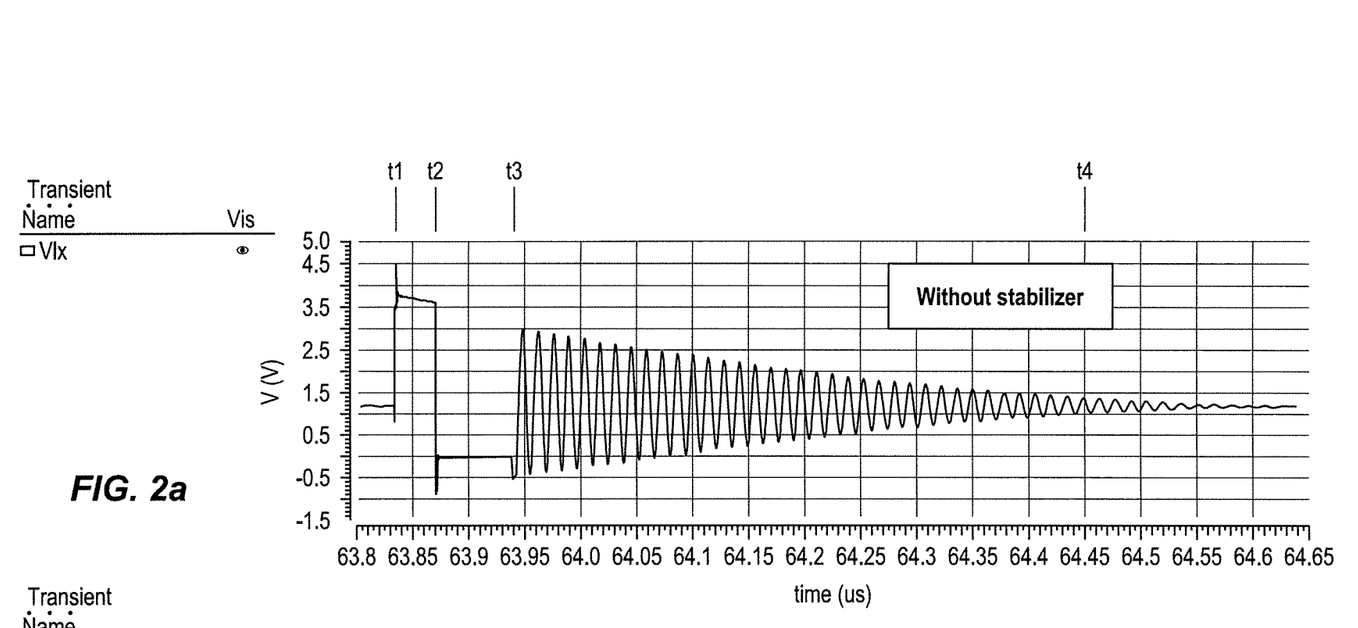
FIGS. 2a and 2b are graphs showing voltage over time at a power stage output node for a power converter without and with a power stage output node stabilizer in accordance with aspects of the invention.
Figure 2B:
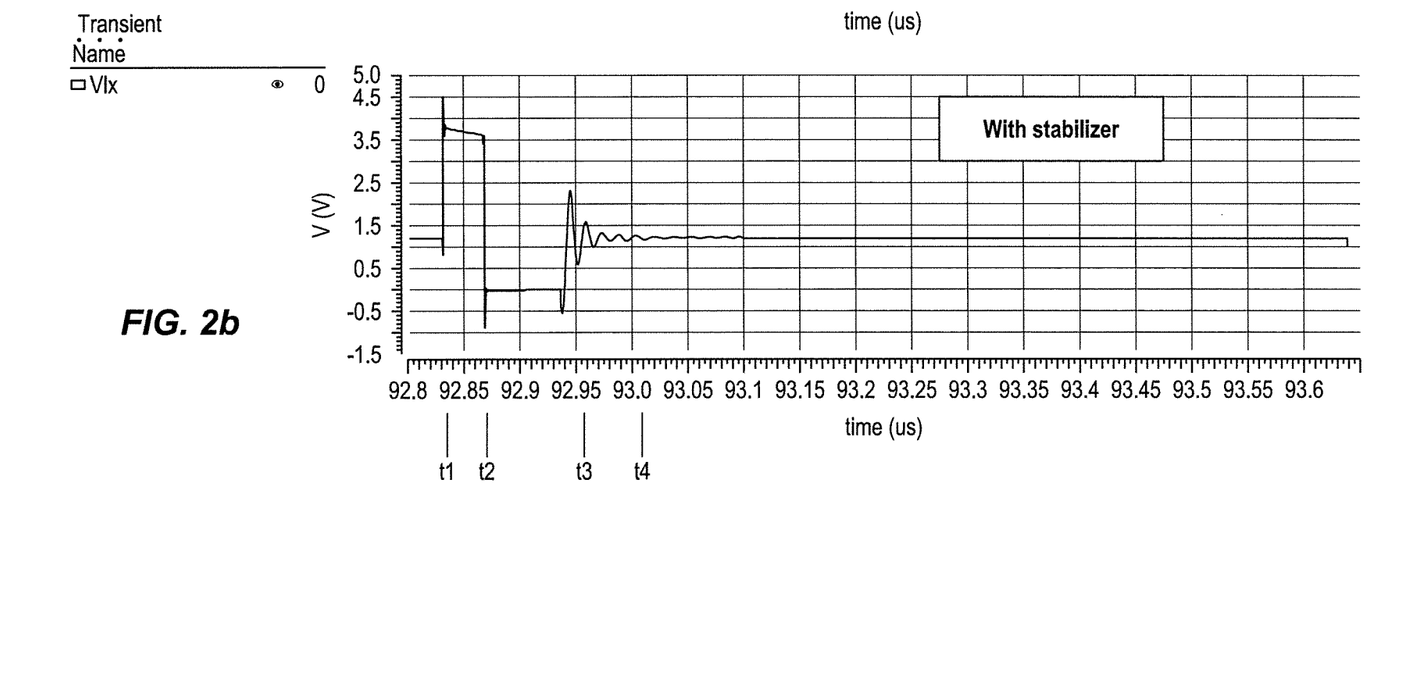

FIGS. 2a and 2b are graphs showing voltage over time at a power stage output node for a power converter without and with a power stage output node stabilizer in accordance with aspects of the invention. FIG. 2a shows voltage over time at a power stage output node for a power converter without a power stage output node stabilizer. At a time t1, a high side switch of the power stage is closed (with the low side switch open), and voltage at the power stage output node rises. At a time t2, the high side switch is opened and the low side switch is closed (in actuality, the high side switch opens slightly before the low side switch closes), and voltage at the power stage output node falls. At time t3 the low side switch opens, and voltage at the power stage output node thereafter exhibits a decaying oscillation, ending approximately at time t4. The decaying oscillation may generate noise and/or cause other difficulties with system operation and/or operation of a load provided power by the power converter.

FIG. 2b shows voltage over time at a power stage output node for a power converter with a power stage output node stabilizer in accordance with aspects of the invention. Labeling corresponding events with a same label as used in FIG. 2a for ease of discussion, at a time t1 a high side switch of the power stage is closed (with the low side switch open), and voltage at the power stage output node rises. At a time t2, the high side switch is opened and the low side switch is closed (in actuality, the high side switch opens slightly before the low side switch closes), and voltage at the power stage output node falls. At time t3 the low side switch opens, and voltage at the power stage output node thereafter exhibits a decaying oscillation, ending approximately at time t4. The decaying oscillation for the embodiment of FIG. 2b, however, decays much faster than the decaying oscillation for the embodiment of FIG. 2a, and time t4 for the embodiment of FIG. 2b is significantly before the time t4 for the embodiment of FIG. 2a. In addition, a peak amplitude of oscillation is also reduced in FIG. 2b, as compared to a peak amplitude of oscillation shown in FIG. 2a.

Figure 3:
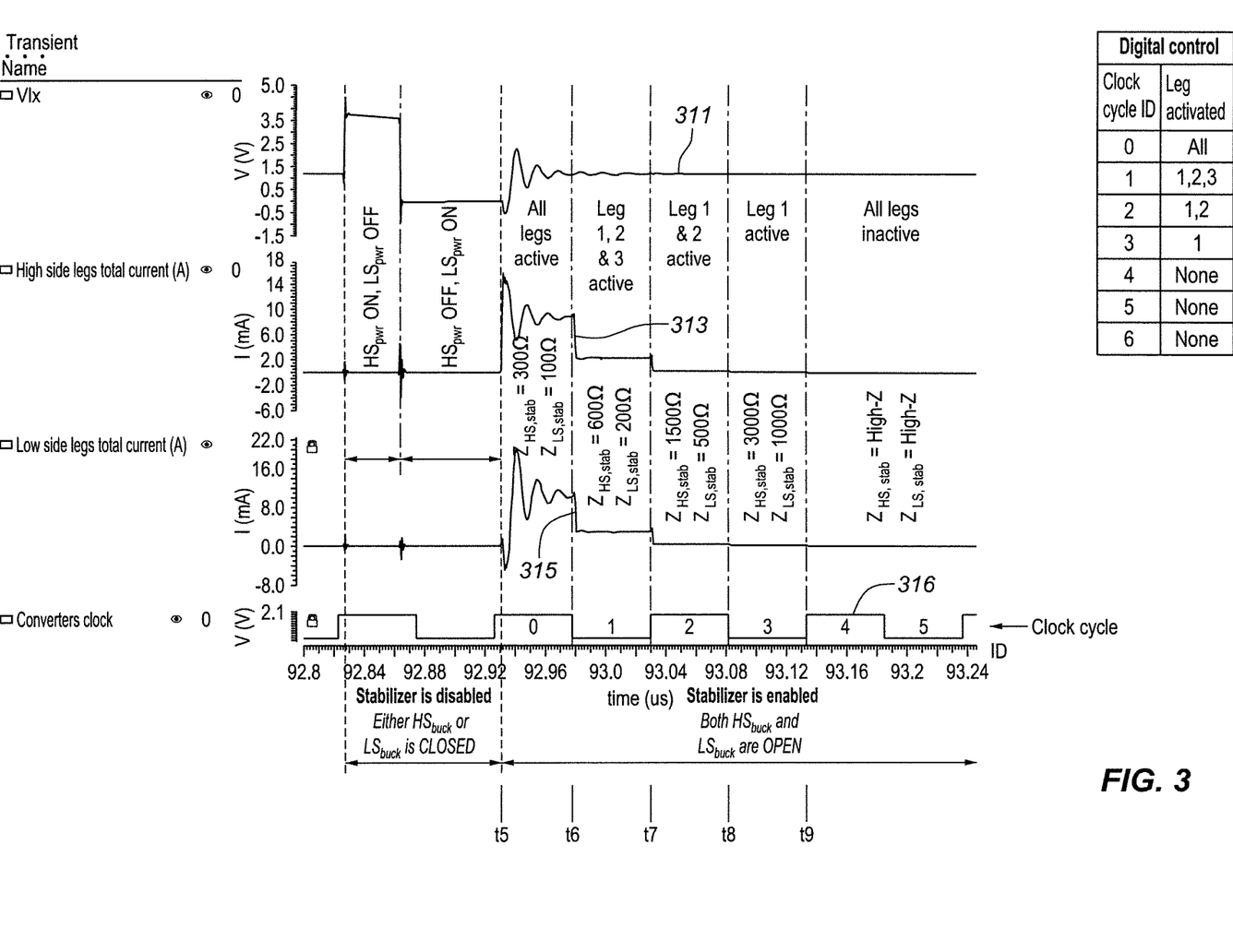
FIG. 3 shows graphs of voltage over time at the power stage output node and current over time through legs of a power stage output node stabilizer in accordance with aspects of the invention.

FIG. 3 shows graphs of voltage 311 over time at the power stage output node of a switching converter and current 313, 315 over time through legs of a power stage output node stabilizer in accordance with aspects of the invention. FIG. 3 additionally shows a graph of a clock signal 316 of the converter. In the example for FIG. 3, a stabilizer is present, for example a stabilizer such as the stabilizer of FIG. 1, with the stabilizer including four legs, a leg 1, leg 2, leg 3, and leg 4. At a time t5 the converter transitions from a conduction phase, where either a high side switch or a low side switch of the power stage is closed, to a non-conduction phase, with the high side and low side switches both open. At time t5 all of the legs of the stabilizer are also activated. With all of the legs activated, total resistance provided by the legs on the high side portions provides a resistance of 300 Ohms, with total resistance provided by the legs on the low side portions provides a resistance of 100 Ohms. Current flows through the activated legs, with current 313 in the high side portions and current 315 in the low side portions exhibiting decaying oscillations with amplitude maxima and minima roughly 180 degrees out of phase with one another. At time t6 one of the legs, leg 4, is deactivated, with the three other legs remaining active. With three of the legs active, total resistance provided by the high side portions of the legs is 600 Ohms and total resistance provided by the low side portions of the legs is 200 Ohms. In such a configuration, at time t6 current through both the high side portions and the low side portions steps down. At time t7 leg 3 is deactivated, at time t8 leg 2 is deactivated, and at time t9 leg 1, the last active leg, is deactivated. For the example of FIG. 3, with deactivation of leg 3 at time t7, resistance of the high and low side portions of the legs increases to 1500 Ohms and 500 Ohms, respectively. Similarly at time t8 resistance of the high and low side portions of the legs increases to 3000 Ohms and 1000 Ohms, respectively, and at time t9 the resistance provided by the portions of the legs may be considered to be of high impedance.

Figure 4A:
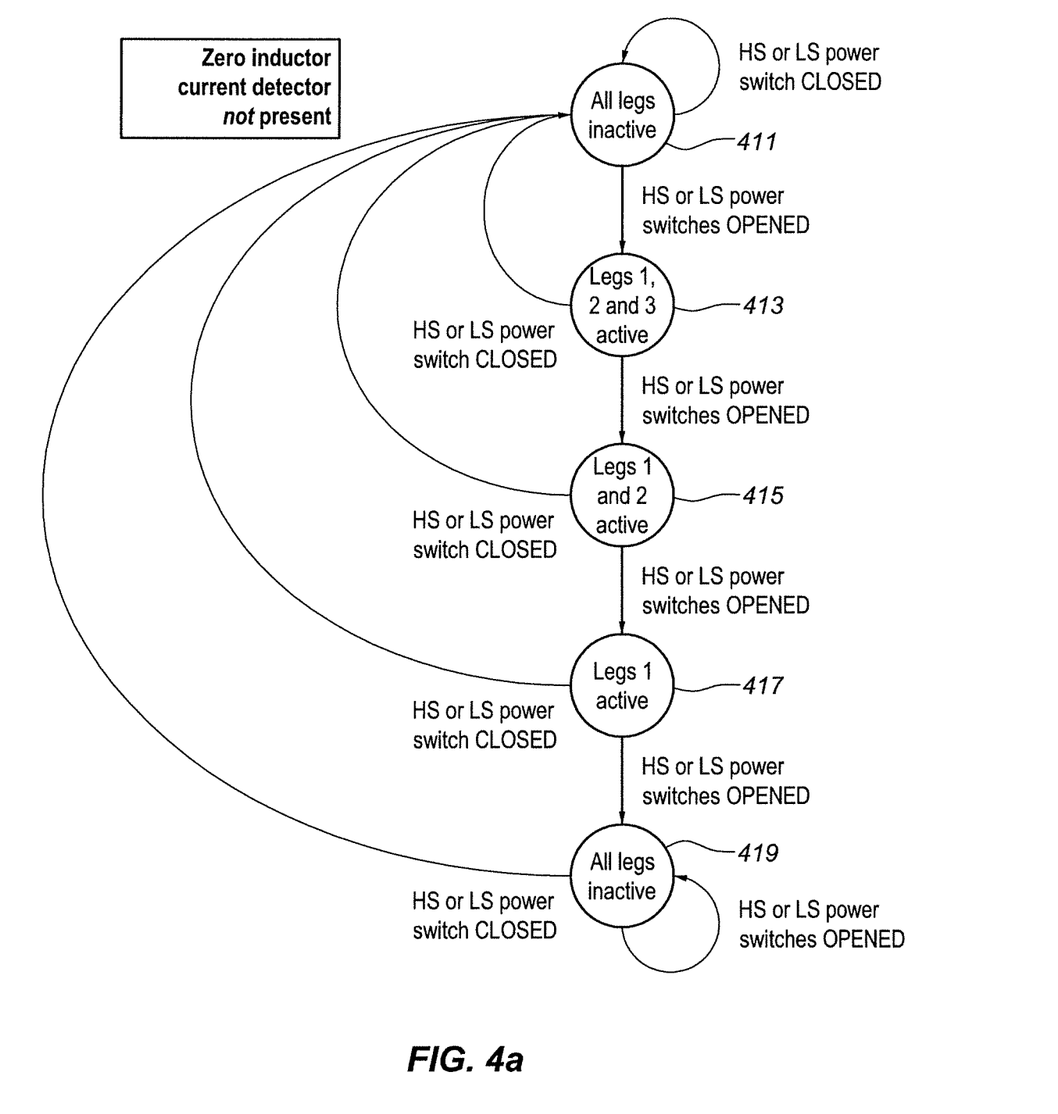
FIGS. 4a and 4b are control flow diagrams illustrating example operations for control of a power stage output node stabilizer in accordance with aspects of the invention.
Figure 4B:
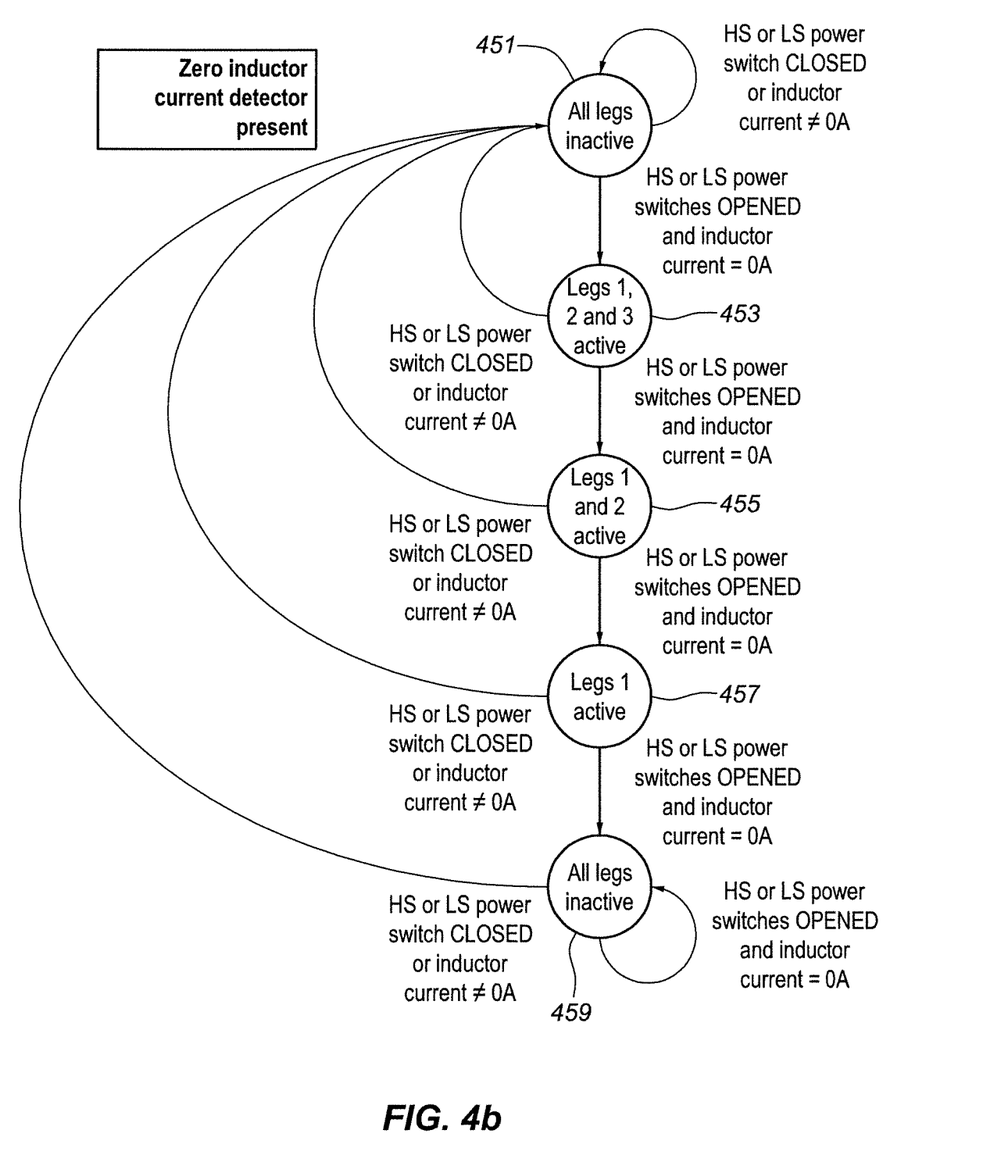

FIGS. 4a and 4b are control flow diagrams illustrating example operations for control of a power stage output node stabilizer in accordance with aspects of the invention. FIG. 4a is a control flow diagram for operations of the stabilizer without reference to indications of inductor current. The control flow diagram of FIG. 4a may be executed by a controller, for example the digital control of the stabilizer of FIG. 1.

In state 411 all legs of the stabilizer are inactive. State 411 is the operating state of the stabilizer when either a high side switch or a low side switch are closed for a power converter for which the stabilizer is used. If both the high side switch and the low side switch are opened, state 411 is exited and state 413 becomes the operating state of the stabilizer. In state 413 all of the legs of the stabilizer are active, with the example stabilizer including 3 legs.

If either the high side switch or the low side switch is closed, state 413 is exited and state 411 becomes the operating state of the stabilizer. Otherwise, at a next clock edge (or predetermined number of clock edges), state 413 is exited and state 415 becomes the operating state of the stabilizer. In operating state 415 one of the legs is inactive, with the remaining two legs remaining active.

Again, if either the high side switch or the low side switch is closed, state 415 is exited and state 411 becomes the operating state of the stabilizer. Otherwise, at a next clock edge (or predetermined number of clock edges), state 415 is exited and state 417 becomes the operating state of the stabilizer. In operating state 417 two of the legs are inactive, with the remaining leg remaining active. Similarly, if either the high side switch or the low side switch is closed, state 417 is exited and state 411 becomes the operating state of the stabilizer. Otherwise, at a next clock edge (or predetermined number of clock edges), state 417 is exited and state 419 becomes the operating state of the stabilizer. In operating state 419 all of the legs are inactive. The stabilizer remains in operating state 419 until either the high side switch or the low side switch is closed.

FIG. 4b is a control flow diagram for operations of the stabilizer with reference to indications of inductor current. Indications of inductor current may be provided, for example, by an inductor current zero crossing detector. The control flow diagram of FIG. 4a may be executed by a controller, for example the digital control of the stabilizer of FIG. 1.

Operations shown in FIG. 4b are similar to those of operations shown in FIG. 4a, with states 451, 453, 455, 457, and 459 corresponding to states 411, 413, 415, 417, and 419, respectively. For FIG. 4b, however, a transition to state 451, with all legs of the stabilizer inactive, is made whenever either the high side or low side switch of the power converter is closed, or inductor current is indicated as not be zero. Similarly, transitions to states 453, 455, 457, and 459 are only made if, in addition to the high side switch and low side switch being open, the indication of inductor current indicates zero inductor current.

Although the invention has been discussed with respect to various embodiments, it should be recognized that the invention comprises the novel and non-obvious claims supported by this disclosure.

What is claimed is:

1. A DC-DC switching power converter with a power stage output node stabilizer, comprising:
   a high side switch and a low side switch coupled in series between a higher voltage and a lower voltage, with a power stage output node between the high side switch and the low side switch;
   an output filter, with a first end and a second end, the first end coupled to the power stage output node;
   a plurality of selectably enabled resistive legs coupling the power stage output node and the higher voltage and the lower voltage, each of the resistive legs including a high side portion coupling the power stage output node and the higher voltage and a low side portion coupling the power stage node and the lower voltage, with for each leg, a ratio between a resistance associated with the high side portion and a resistance associated with the low side portion equal to a ratio between a desired voltage to be provided to the load and a difference between the higher voltage and the lower voltage.

2. The DC-DC switching power converter with a power stage output node stabilizer of claim 1, wherein resistances associated with the high side portions of at least some of the legs differ from each other.

3. The DC-DC switching power converter with a power stage output node stabilizer of claim 1, wherein resistances associated with the low side portions of at least some of the legs differ from each other.

4. The DC-DC switching power converter with a power stage output node stabilizer of claim 1, wherein each high side portion of each resistive leg includes a first switch for activating that high side portion, and each low side portion of each resistive leg includes a second switch for activating that low side portion, and further comprising a digital control to activate and deactivate the first switches and the second switches.

5. The DC-DC switching power converter with a power stage output node stabilizer of claim 4, wherein the digital control is configured to activate the first switches and the second switches only when both the high side switch and the low side switch are open.

6. The DC-DC switching power converter with a power stage output node stabilizer of claim 5, wherein the control is configured to deactivate the first switches and the second switches over a period of time.

7. The DC-DC switching power converter with a power stage output node stabilizer of claim 4, wherein the digital control is configured to activate the first switches and the second switches only when both the high side switch and the low side switch are open and the DC-DC switching power converter is in discontinuous conduction mode (DCM).

* * * * *